United States Patent
Heatley et al.

(10) Patent No.: US 7,343,941 B2
(45) Date of Patent: Mar. 18, 2008

(54) METHOD OF PREPARING A PRESSURIZED CONTAINER OF PIGMENTED PAINT

(75) Inventors: Christopher Heatley, McHenry, IL (US); William G. Zanellato, Sycamore, IL (US)

(73) Assignee: Seymour of Sycamore, Sycamore, IL (US)

( * ) Notice: Subject to any disclaimer, the term of this patent is extended or adjusted under 35 U.S.C. 154(b) by 280 days.

(21) Appl. No.: 11/197,976

(22) Filed: Aug. 5, 2005

(65) Prior Publication Data

US 2006/0260714 A1  Nov. 23, 2006

Related U.S. Application Data

(63) Continuation-in-part of application No. 10/913,557, filed on Aug. 6, 2004, now Pat. No. 7,201,191.

(51) Int. Cl.
*B65B 1/04* (2006.01)

(52) U.S. Cl. .................. 141/9; 141/3; 141/20; 141/104; 141/329; 53/470

(58) Field of Classification Search .................. 141/2, 141/3, 9, 20, 100, 104, 329, 346–348; 53/467, 53/470, 473
See application file for complete search history.

(56) References Cited

U.S. PATENT DOCUMENTS

| 3,335,765 | A | | 8/1967 | Moonan | |
|---|---|---|---|---|---|
| 3,604,477 | A | * | 9/1971 | Grothoff | 141/20 |
| 3,620,266 | A | * | 11/1971 | Ryder | 141/20 |
| 3,797,534 | A | | 3/1974 | Skidmore | |
| 4,427,039 | A | * | 1/1984 | Brooks et al. | 141/20 |
| 4,938,260 | A | | 7/1990 | Hirz | |
| 5,247,777 | A | * | 9/1993 | Smith et al. | 53/88 |
| D361,581 | S | | 8/1995 | Hirz | |
| 5,535,790 | A | | 7/1996 | Hirz | |
| 5,647,408 | A | | 7/1997 | Erste et al. | |
| 5,740,841 | A | | 4/1998 | Hirz | |
| 5,832,965 | A | | 11/1998 | Fasse et al. | |
| D424,662 | S | | 5/2000 | Gieske | |
| 6,077,898 | A | | 6/2000 | Flores | |
| 6,135,165 | A | | 10/2000 | Zanellato et al. | |
| 6,302,163 | B1 | | 10/2001 | Zeigler | |

(Continued)

FOREIGN PATENT DOCUMENTS

WO   WO 02/41981 A   5/2002

OTHER PUBLICATIONS

International Search Report for PCT/US2005/024475.

(Continued)

*Primary Examiner*—Timothy L. Maust
(74) *Attorney, Agent, or Firm*—McDonnell Boehnen Hulbert & Berghoff LLP

(57) ABSTRACT

A pressurized package contaning an initial paint formulation having a neutral or clear color is prepared by mixing a propellant and a clear non-pigmented base or a clear pigmented base or a white pigmented base in a pressurizable container. This pressurized container is then sold to retail stores where tints and/or pigment dispersions are injected into the pressurized container to arrive at a matched or selected final color and sold directly to the end user.

1 Claim, 1 Drawing Sheet

U.S. PATENT DOCUMENTS 6,543,490 B1  4/2003  Owens
6,705,359 B1  3/2004  Zanellato et al.
6,948,534 B1 * 9/2005  Hirz ............................ 141/20
7,201,191 B2 * 4/2007  Heatley et al. ................. 141/9

2003/0146244 A1  8/2003  Sanders

OTHER PUBLICATIONS

International Search Report for PCT/US2006/030700.

* cited by examiner

METHOD OF PREPARING A PRESSURIZED CONTAINER OF PIGMENTED PAINT

RELATED APPLICATIONS

This application is a continuation-in-part application of co-pending application U.S. Ser. No. 10/913,557, filed Aug. 6, 2004 now U.S. No. 7,201,191.

BACKGROUND OF THE INVENTION

This invention relates to a method and a system to allow for the preparation of a pressurized paint formulation of a desired color and gloss at the point of retail sale to the ultimate end user. In particular, my invention involves providing a container pressurized with a solvent and a neutral or clear initial paint formulation, whereby the end user selects or matches a desired color and gloss and where a filling machine is used to add the tints or pigment dispersions through a septum made of a resilient material to achieve the matched or selected final color of the paint. Alternatively, my invention includes providing a pre-pressurized container fitted with a septum and containing at least a propellant, whereby a fully formulated paint mixture can be pumped into the container through the septum to result in a pressurized container of paint.

One of the most significant developments in the field of paints and other protective coatings is the introduction and development of aerosolized coatings, most commonly referred to as "spray paint." Retail stores have shelf upon shelf of these pre-filled pressurized containers of complete paint and coatings formulations, in every imaginable color and gloss that are "ready to use". These complete, pre-packaged spray paint containers provide the customer with a convenient means to purchase small quantities of paint in a readily useable spray container for easy application. Unfortunately, in situations where the end user has a particular color in mind or wants to match a particular existing color, the current art of spray paint forces the end user to select a paint color that in most cases is not the exact color that the user desires. This is because there is no convenient means to allow a consumer to select a color and have that exact color made at the point of purchase. Instead, the user must search a myriad of brands of spray paint in the hope of finding a color that at least comes close to the desired color. Often times, this causes the end user to travel from store to store in search of such a match. Another drawback of the conventional spray paint product is that the inability to prepare a final paint color at the point of sale directly affects the retailer. Because conventional spray paint is only available from the manufacturer in pre-selected and predetermined colors and gloss, the retailer is forced to stock and carry inventory for a large number of cans to accommodate a large number of colors and gloss finishes. This further requires the use of an inordinate amount of shelf space in the store, thus limiting the amount of other products that can be displayed.

A convenient solution to the above mentioned problems would be to allow the retail outlet at the point of sale to formulate the final color of the spray paint based on the end user's selections of color and gloss at the moment of sale. In this way only a very limited number of spray containers containing either a clear or neutral base paint formulation need to be stocked and shelved by the retailer. The end user can then select a final paint formulation that exactly matches his or her needs. Our invention, as described below, provides this solution and solves the above-mentioned problems by combining a means to match or select color and gloss with a means to formulate and add the necessary tints and pigment dispersions to a pre-pressurized container to achieve the desired final paint formulation at the point of sale. Our invention further benefits the retailer by greatly reducing inventory and freeing up valuable shelf space for other store products.

Although my earlier issued U.S. Pat. Nos. 6,705,359 and 6,135,165 describe a pressurized container containing certain paint additives that is eventually filled with a final water-borne paint composition of a selected color at the point of sale, those patents do not disclose the methods and systems described herein. In particular, my earlier invention was limited to providing a pressurized can containing all the ingredients except the final pigmented paint formulation, and moreover, that final pigmented paint formulation was limited to water borne formulations. In addition to my earlier invention, the prior art has recognized that there may be some benefit to providing pressurized, sealed containers containing only a propellant that can then be filled with a "custom" paint formulation. U.S. Pat. Nos. 5,740,841; 5,647,408; Des. 361,581; U.S. Pat. Nos. 4,938,260; and 5,535,790, each describe various filing machine designs that can inject a complete "custom" paint formulation into a pressurized can. In contrast, our current invention provides a pressurized container containing a base or neutral initial paint formulation and requires only small amounts of tints and/or pigment dispersions, not complete paint formulations, to be added at the point of sale based on a color and gloss match or a selection by the end user. These references, as well as my earlier patents and the art cited therein are incorporated by reference in this application.

SUMMARY OF THE INVENTION

The present invention provides a method of preparing an aerosol container of paint or other coating at a point of sale location comprising, in combination, providing a pressurized container for use in formulating a final paint mixture, the container having a filling opening fitted with a septum and containing an initial paint formulation comprising a propellant and at least one of a clear non-pigmented base or a clear pigmented base or a white pigmented base; introducing the pressurized container into a filling machine; matching or selecting a final color and a gloss for the final paint mixture; determining types and amounts of tints or pigment dispersions to achieve the matched or selected final color; adding one or more tints or pigment dispersions to the pressurized container through the filling opening; and attaching a spray head to the container. The present invention also provides a system to allow the preparation, at a point of sale, of a ready to use aerosol container of paint comprising, in combination, a pressurized container for use in formulating a final paint mixture having a filling opening fitted with a septum and containing an initial paint formulation comprising a propellant and at least one of a clear non-pigmented base or a clear pigmented base or a white pigmented base; a computer controlled filling machine in communication with a processor; a means for matching or selecting a final color and a gloss for the final paint mixture; a first computer algorithm in the processor to determine types and amounts of tints or pigment dispersions to achieve the matched or selected final color; a second computer algorithm in the processor to automatically add one or more tints or pigment dispersions to the pressurized container through the filling opening; and a spray head and a cap.

The present invention also provides a method of preparing an aerosol container of paint or other coating at a point of sale location or at the location of actual use comprising, in combination, providing a pressurized container for use in formulating a final paint mixture, the container having a filling opening fitted with a septum and containing at least a propellant; providing a fully formulated paint mixture; and injecting the paint mixture into the container through the septum.

The invention may take form in various parts and arrangement of parts. The drawing is only for purposes of illustrating a preferred embodiment and is not to be construed as limiting the invention.

DETAILED DESCRIPTION

Figure 1:
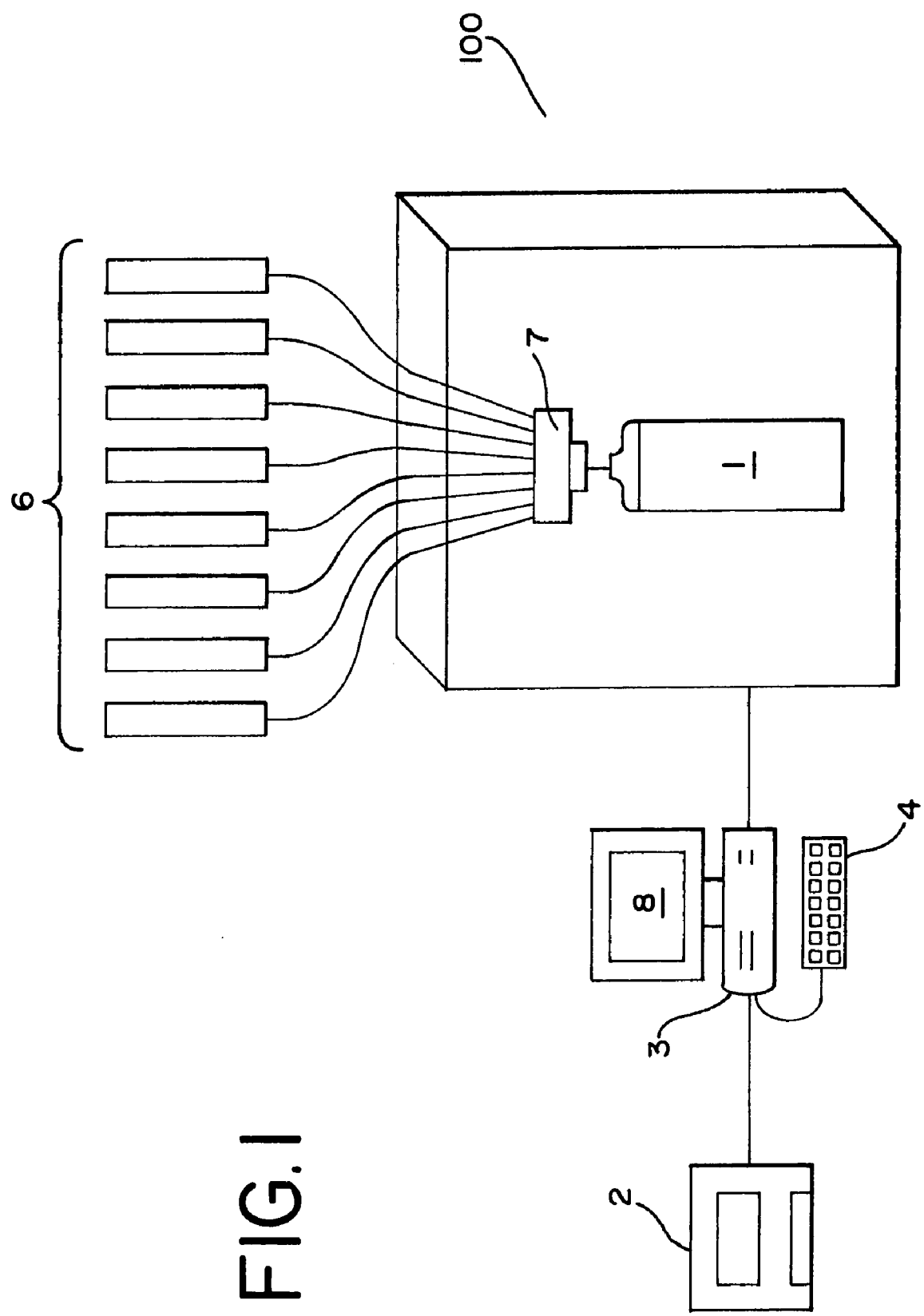
FIG. 1 shows a schematic representation of one embodiment of the system of our invention.

A critical aspect of this invention is providing to the point of sale a pressurized container containing an initial paint formulation that comprises at a minimum both a paint base and a propellant, whereby as a last step, tints and/or pigment dispersions are added immediately prior to the purchase by the user of the aerosolized paint. A necessary component of the initial paint formulation of our invention is the inclusion of a propellant in the pressurized container as it is provided to the retail location. The particular propellant selected will depend on whether the initial paint formulation is water base or solvent based. As used herein "solvent based" refers to a paint formulation soluble in one or more hydrocarbons. When the initial paint formulation is water based, then one particularly preferred propellant is dimethyl ether (DME), however, any known water soluble propellant will work. DME is a commercially available liquefiable gas having a boiling point of −23° C. at one atmosphere, and is soluble in water to the extent of about 35% by weight at 24° C. at about 5 atmospheres of pressure. Although any commercially available DME can be used in the present invention, one commercial supplier of DME is DuPont®. Although DME is a preferred propellant, other propellants may be used alone or in addition to DME, for example, propane, carbon dioxide, and nitrous oxide. In those circumstances where the initial paint formulation is solvent based, then an acceptable propellant is propane, however, any known propellant compatible with a solvent based paint formulation will work. Regardless of the chemical make-up of the propellant, the propellant must be able to pressurize the initial paint formulation for delivery to the substrate or surface to be coated once the container is filled and crimped at the point of manufacture of the container.

In addition to the propellant, the pressurized container provided at the point of sale location, most typically a retail store, contains at least one of a clear non-pigmented base or a clear pigmented base or a white/off-white or neutral base. This neutral or clear base may be ether, water, or hydrocarbon based, however, its chemical composition is not critical to our invention provided that it is white, medium, or deep base (i.e., clear) in color. A white base would be one where the titanium dioxide ($TiO_2$) level was about at least 10% by weight of the initial paint formulation. A medium base color is where the $TiO_2$ level is about less than or equal to 2 wt. % and the deep base would have no $TiO_2$ present. The initial paint formulation also has a predetermined gloss level, preferably flat, semi-gloss or gloss. The gloss can be further adjusted at the point of sale based on the end user's desired level of gloss through the addition of flattening dispersions. An example of a known flattening dispersion is one manufactured by Elementis, known as Flat—Ayd FA-W34. The level of gloss of a final paint formulation is determined by the use of a gloss meter. Depending on the amount of flattering dispersion added, the final paint formulation can be adjusted to varying degrees of different gloss levels.

In addition to the propellant and bases, the initial paint formulation may also contain several other components in order to obtain the ultimate desired coating. These other components are dependent upon whether the final spray paint product will be water or hydrocarbon based. When the initial paint formulation is water based, then it is preferred that the container also contain an emulsion, and possibly stabilizers.

The emulsion agent in a water based system, applicable for use in this invention consist of those rendered water soluble by neutralization of acidic or basic sites thereon which render the emulsion dispersible in molecular or near molecular dimensions, resulting in a single liquid phase. The emulsion agent used can be polyurethane, acrylic, epoxy, styrene, butadiene and any mixture thereof although this group is not limiting. Indeed, other resin examples include styrene acrylics, alkyds, polyesters, and silicone polymers. Water soluble emulsions are commercially available through several different suppliers. One example of a commercially available acrylic latex emulsion suitable for use herein is one obtained from S.C. Johnson Polymer, namely Joncryl 537. The addition of certain acrylic emulsions to the latex system serves to prevent gloss loss, to prevent agglomeration and to prevent stability problems with nearly any latex paint.

The stabilizers used in a water based formulation are selected from the group consisting of surfactants, plastizers, antifoam agents, pH buffers and mixtures thereof. In particular fluoro surfactants are preferred, specifically FC-4430 manufactured by 3M. The stabilizers are necessary to insure that the water borne paint formulation, in particular the pH of the concentrate, will not have a corrosive effect on the container. Suitable pH buffers include ammonia, and amines such as triethanol amine. Other suitable stabilizers include AMP-95. When the initial paint formulation is solvent based additional hydrocarbons, flow additives, and/or resins may be added to achieve the desired final coating effect.

In preparing the pressurized container for delivery to the point of sale, it is desirable to add all of the initial ingredients of the initial paint formulation except the propellant. By adding the propellant last, the propellant can be used to pressurize the container and the initial paint formulation.

Once the pressurized container of initial paint formulation is prepared, the container is ready for display and sale at the retail level. Immediately prior to the sale, the ultimate end user selects a final color and gloss level to complete the final paint formulation. A recipe is used to add either volumetric or weighed amounts of tints and/or pigment dispersions to the pressurized container through a filling opening in the pressurized container to achieve the desired final color. The design and location of the filling opening is not critical to the invention, however, a preferred design places the filling opening where the spray head attaches to the container after filling. Alternatively, the filling opening can comprise a hole that is fitted with a septum made of a resilient material. This hole and septum arrangement may be placed in any convenient location on the container, preferable either at the top or bottom of the container. Filling the container using such an arrangement involves the use of a needle-like structure associated with a pump or syringe-type device that is capable of over coming the pressure in the container while injecting material into the container through the septum. Such a device would be similar in design to the hand-held pumps used to inflate a basketball or soccer ball.

Typically, the final color desired is based on a matching of an existing color or type of paint previously purchased by the user. The end user will select a final color for the aerosol container of our invention by one of several methods. The user may manually reference a color wheel, paint swatches, or paint chips to select a final color and will also select or request a preferred gloss level. For each color that can be selected there will be a corresponding predetermined recipe of tints and/or pigmented dispersions that when mixed with one of the three possible initial paint formulations will yield the final desired color.

Alternatively, the user may want to match an existing color based on a sample of a color that they would bring with them to the point of sale. This can be done by simply comparing the known color provided by the user to a color wheel or to paint swatches, or by using a spectrophotometer or other automated system to match colors. Typically, such an automated procedure involves providing a sample of a known color for analysis by a spectrometer whereby the exact sample color is determined and reported to either the end user or the retail store operator or directly to a computer controlled filling machine. U.S. Pat. No. 6,400,906, which is incorporated fully herein by reference, discloses a paint matching process and apparatus that could be adapted to arrive at a suitable recipe for tints and/or pigment dispersions. Any known method of determining sample color is applicable to our invention. Once the sample color is determined, the next step involves the selection of pigmented dispersions and/or tints that must be added to the pressurized container to achieve the desired color of the final paint formulation. Additionally, flattening dispersions may be added to achieve the desired gloss level. As previously mentioned, a gloss meter is typically employed to measure the gloss level, preferably at a 60° angle. Flattening dispersions are added to modify the gloss level to the desired finish.

Examples of the tints and pigmented dispersions that are useful in our invention to arrive at the final desired color include, but are not limited to titanium dioxide, carbon black, phthalocyanimes, molybdates, quinacridones, iron oxide and other known paint tint bases. The specific amounts of tints and/or pigment dispersions to add to the pressurized container are predetermined and correspond to the many possible final colors that are eventually selected by the end user. For example, if the final desired color was selected to be ASA 61 Gray then the predetermined recipe corresponding to that particular gray color is 50 g of white ($TiO_2$); 2.5 g yellow oxide; 1.95 g black; and 0.26 g blue dispersions. As long as the weight ratios of these colors are added to the container, taking into account the starting color of the initial point formulation in the pressurized container, the desired gray color will be achieved. In other words, if the initial paint formulation chosen contains the white base, then the amount of $TiO_2$ tint added must be adjusted to take into account the $TiO_2$ already present in the initial paint formulation such that the above weight ratios of different tints remains constant. In the situations where a color wheel or a paint swatch is the medium used to select a final color, each of the possible final colors will have associated with it a recipe of tints and/or pigment dispersions known to those skilled in the art that when added to the pressurized container will result in the color selected by the user, again taking into account the starting color of the initial paint formulation. In the situation where a spectrophotometer or other automated color determination instrument is used, the instrument will calculate and/or recall from electronic memory a recipe of tints and/or pigment dispersions that must be added to the pressurized container to achieve the final color. Again, before the amounts of tints or pigment dispersions are calculated, the computer must know the starting color of the initial paint formulation. In those situations where our invention includes a computer controlled filling machine, the instrument, after determining the recipe to arrive at the final color, will provide instructions that will cause the filling machine to inject the appropriate amounts of tints and/or pigment dispersions into the pressurized can.

Filling machines are well known in the aerosol paint industry and include both automated and manual types. The exact design of the filling machine is not critical to our invention, however, a preferred design is an automated, computer controlled machine that allows the user to insert a pressurized container into the machine and then input a recipe or other instructions that initiate a sequence of events whereby the computer automatically controls the addition of the necessary tints, paint dispersions, flattening dispersions or other ingredients necessary to arrive at a final paint formulation that matches the color and gloss selected by the end user or purchaser. The can filling machine can be any apparatus that is known in the art such as a pneumatically controlled aerosol can filling machine. U.S. Pat. No. 4,938,260 (Hirz), the teachings of which are incorporated herein by reference discloses one type of filling machine that could be adapted to work in our invention. Likewise, U.S. Pat. Nos. 5,328,057 and 6,726,065, and the references disclosed in those, describe filling machines that are typically used to add pigments to non-pressurized cans and containers of base paints. Alternatively, as mentioned, the filling machine may be of a relatively simple design that comprises a needle-like structure attached to a plunger/cylinder assembly, akin to the hand-held pumps used to inflate a soccer ball. In the situations where the container has a septum this alternative filling machine can be used to inject tints and/or pigment dispersions into the container. One important design criteria is that the filling machine must be able to overcome the existing pressure of the can during the addition of the tints and/or pigment dispersions.

In the situation where the filling opening is fitted with a septum, it is possible that the end user of the container, as opposed to a retail person, could inject a fully formulated paint mixture through the septum using a hand-held pump as previously described at the location where the paint is to be applied to a substrate. The fully formulated paint mixture could be obtained at a retail outlet where it could be sold in relatively small quantities of approximately 4-10 oz. and provided to the end user in a non-pressurized container. Because the paint mixture would be fully formulated, all that the end user would need would be a container pre-filled and pre-pressurized with a propellant, although other enhancers could be included as well. In one embodiment the end user could purchase the paint mixture at one retail location and the pre-pressurized container at another location. Then, before the paint is to be applied, the user would use a hand-held pump device to inject the paint mixture into the container through the septum fitted in a filling opening in the container.

FIG. 1 is a schematic illustration of one possible design of a computer controlled filling machine having a spectrophotometer or other color determining instrument associated therewith. That figure illustrates one possible configuration of system 100 of our invention, where spectrophotometer 2 is in communication with computer 3. Computer 3 can have a central processing unit (CPU) (not shown) which contains a number of algorithms and computer software to operate filling machine 5. Computer 3 always has a manual input means, such as key board 4 or touch screen 8, to allow a user, typically the retail store operator, to input data, for example the type of initial paint formulation in pressurized container 1 and a recipe of tints. Alternatively, the filling machine may have associated with it a bar code scanner (not shown) that can be used to determine the initial paint formulation contained in the pressurized container. In the situation where the ultimate end user of the paint wants to match an existing paint color, spectrophotometer 2 or some other automated color analysis device, will be used to determine the color of a sample provided by the end user. Once the color is determined, this information is communicated to computer 3 where a recipe of tints and/or pigment dispersions is determined based on the initial paint formulation contained in pressurized container 1. Computer 3 will control the addition of tints and/or pigment dispersions stored in reservoirs 6 that are connected to valve 7 which is designed to inject the recipe into pressurized container 1. The specific mechanism to inject the recipe of tints into the container is not critical to the invention provided that an accurate delivery of the correct volumetric or weight ratios of the tints are delivered into the initial paint formulation in the can. Once the recipe of tints and/or pigment dispersions is injected into the initial paint formulation a spray head is attached to the container. The spray head may be of the female or male variety and its design is not critical to our invention.

In some instance individual volumes and/or weights of tints, pigment dispersion, flattening dispersions or other additives can be keyed into the computer directly by the user. Once keyed in, the computer would control and operate the machine to add the keyed in additives to the pressurized container.

Product enhancers, such as thickeners, corrosion inhibitors and flow modifiers, may also be added by the filling machine into the initial paint formulation without departing from the spirit of the disclosure for the scope of the appended claims. Total miscellaneous paint enhancers will generally constitute less than about 5% by weight of the total aerosol can content. These are preferably added during the preparation of the aerosolized container containing the initial paint formulation prior to the addition of the tints, pigment dispersions or other additives at the point of sale. Thickeners are employed as an ingredient because of their marked increase in the viscosity of the composition which prevents the occurrence of undesirable "running" of the wet paint film when it is sprayed onto a slanted or vertical surface. A wide variety of acrylic emulsion thickening agents are commercially available. One example is Kings PUR 60. An example of a commercially available corrosion inhibitor is AMP-95 and example of a commercially available flow modifier is any fluorosurfactant.

It should be understood that the embodiments and examples disclosed herein are presented for illustrative purposes only and that many other combinations and articles that embody the methods, formulations and systems will be suggested to persons skilled in the art and, therefore, the invention is to be given its broadest interpretation within the terms of the following claims:

We claim:

1. A method of preparing a ready to use aerosol container of paint comprising, in combination,
   a. providing a pressurized container for use in formulating a final paint mixture, the container having a filling opening fitted with a septum and containing at least a propellant;
   b. determining a recipe of tints or pigment dispersions or combination of both to achieve the final paint mixture;
   c. preparing a liquid paint mixture of tints, pigment dispersions or a combination of both based on the recipe determined in step b.; and
   d. injecting the paint mixture into the container through the septum using a needle-like structure connected to a hand-held pump device configured small enough that the pump can be held by a user of the pump while injecting the paint mixture.

* * * * *